United States Patent [19]

Lange

[11] 4,375,528
[45] Mar. 1, 1983

[54] WATER SOLUBLE OIL MODIFIED IMIDIZED POLYESTERS

[75] Inventor: Daniel J. Lange, St. Louis, Mo.

[73] Assignee: The P. D. George Company, St. Louis, Mo.

[21] Appl. No.: 266,997

[22] Filed: May 26, 1981

[51] Int. Cl.³ .................. C09D 3/56; C09D 3/64; C09D 3/66; C09D 5/25

[52] U.S. Cl. .................... 524/538; 524/539; 524/602; 525/501.5; 528/322

[58] Field of Search .............. 528/322; 260/22 TN, 260/22 R, 20, 21, 22 CQ; 524/538, 539, 602; 525/501.5

[56] References Cited

U.S. PATENT DOCUMENTS

| | | | |
|---|---|---|---|
| 3,297,785 | 1/1967 | George et al. | 260/22 TN |
| 3,312,645 | 4/1967 | George et al. | 260/22 CQ |
| 3,426,098 | 2/1969 | Meyer et al. | 260/22 TN |
| 3,663,510 | 5/1972 | Peterson | 260/29.2 N |
| 3,752,778 | 8/1973 | Dhein et al. | 260/22 TN |
| 3,759,853 | 9/1973 | Formaini et al. | 260/22 CQ |
| 3,891,601 | 6/1975 | Peterson et al. | 260/29.2 N |
| 3,945,959 | 3/1976 | Lange | 260/20 |
| 4,116,904 | 9/1978 | Verma | 260/22 R |
| 4,206,098 | 6/1980 | Sattler et al. | 260/22 TN |
| 4,288,351 | 9/1981 | Miller et al. | 260/22 CQ |

*Primary Examiner*—Ronald W. Griffin
*Attorney, Agent, or Firm*—Sidney B. Ring; Hyman F. Glass; Leon Zitver

[57] ABSTRACT

This invention relates to (1) water soluble and/or dispersible compositions characterized by the presence of oil modified imidized polyesters; and to (1) which also contains curable resins. This invention also relates to a wide variety of uses for such compositions, such as electrical insulations, for example as in insulation varnishes, and related uses.

31 Claims, No Drawings

WATER SOLUBLE OIL MODIFIED IMIDIZED POLYESTERS

Most of the conventional insulating varnishes are of the solvent-based type dissolved in an organic solvent such as cresol, xylene or naphtha. These varnishes, however, have involved high production costs because the solvent volatilizes during the production of insulated electric wires, cables and the impregnation of electrical components making it necessary to incinerate it, using a burning furnace. The use of these organic solvents also is likely to cause air pollution, and because of the offensive odor of the organic solvent, the working environment is not entirely satisfactory. In addition, there is always a danger of fire because of the flammability of the solvent. It has therefore been desired to develop insulating varnishes which have reduced likelihood of causing these hazards.

For example, U.S. Pat. No. 3,945,959 describes and claims oil modified imidized polyester resins employed in an organic system.

Therefore, in the interests of avoiding these deficiencies of solvent systems, it is highly desirable to replace such systems with aqueous systems.

I have now discovered oil modified imidized polyester resins which can be employed in aqueous systems.

These systems are characterized as oil modified polyesters (alkyds) which also contain imido groups. In the preferred embodiment they also contain resins such as phenolic resins, triazine resins, etc., curing agents, etc., as well as water solubilizing compounds such as tertiary amines, etc.

The process of this invention comprises:

I. The preparation of the oil modified imidized polyesters. It may be prepared in one or more stages. For example the fatty acid modified polyesters can be prepared first and then the imido reactants added or it can be prepared in one stage.

II. The addition of the solutizer reagent which is generally a polycarboxylic acid such as dicarboxylic acids such as phthalic, isophthalic, maleic, etc., but preferably a tricarboxylic acid such as trimellitic anhydride.

III. The addition of the curing resins such as phenolic resins, triazine resins, melamine aldehyde, ureaaldehyde, etc.

IV. The addition of the tertiary amine to form solubilizing salts.

V. The addition of other desired additives such as driers, etc.

This formulation is then applied to the material to be electrically insulated.

ALKYD COMPONENT

One of the principal components in the preparation of an impregnating type of insulating varnish is an alkyd of the oil- or fatty acid-modified type. The oil or fatty acid may be of the saturated or unsaturated type wherein, in the latter type, the fatty acid contains one or more double bonds per molecule.

These alkyd resins can be prepared by a variety of techniques. If an oil (drying or non-drying triglyceride type) is chosen, then it is reacted with a polyhydric alcohol to undergo an ester-interchange or alcoholysis thereof, and subsequently esterified with an aromatic dicarboxylic acid, such as isophthalic acid, to form the first stage of the alkyd prepolymer. In the second stage, a variety of saturated, and unsaturated dicarboxylic acids or anhydrides thereof of the aliphatic, cycloaliphatic or aromatic types are added as solubilizing reactants and esterified at temperatures ranging from 150° C. to about 200° C. until an acid number of 20 to 100 on the solid resin is attained.

Another and more preferred technique is to start with the fatty acids and prereact them with polyhydric alcohols or a combination of polyhydric and dihydric alcohols and aromatic dicarboxylic acids to an acid number ranging from 10 to 30 on a solids basis for the first stage. The second stage is then carried out exactly as described above. Employing fatty acid reactants, rather than oils, allows greater selection in the choice of fatty acid and polyhydric alcohol employed.

In formulating these alkyd resins the oil length or percentage of oil may range from 5 to 80% of the alkyd solids. The unsaturated fatty acids contain one or more double bonds per molecule, and where two or more double bonds are present, they may be in conjugated or unconjugated positions. The saturated monocarboxylic acids may range from 8 to 24 carbons in length.

The esterification or condensation reaction is followed by measuring the viscosity of a sample at a certain solids and the acid number of a sample by titrating it with alcohol or aqueous potassium hydroxide solution (0.1 N) to determine the number of milligrams of potassium hydroxide equivalent to the acidity of one gram of resin. When the desired viscosity and acid number are attained the alkyd component is cooled to 150° C. and thinned with a solvent, such as a glycol ether, to about 70 to 90% solids to form the alkyd concentrate.

The polyhydric alcohols (polyols other than diols) that are preferred include trimethylol propane, trimethylol ethane, glycerine, 3-methyl-1,3,5-hexene triol, tris(-hydroxyethyl) isocyanurate, and pentaerythritol.

Examples of dihydric alcohols which can be used include ethylene glycol, propylene glycol, 1,3-butanediol, 1,4-butanediol, 1,5-pentanediol, 1,6-hexanediol, 1,7-heptanediol, 1,8-octandeiol, 1,9-nonanediol, 1,10-decanediol, diethylene glycol, dipropylene glycol, triethylene glycol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfide, 4,4'-dihydroxyethyldiphenyl sulfide, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, bis-(2-hydroxyethyl)terephthalate, bis-(2-hydroxyethyl isophthalate and bis-(2-hydroxyethyl)phthalate.

The dihydric alcohols (diols) that are preferred include neopentyl glycol, ethylene glycol, propylene glycol, 1,3-butylene glycol, diethylene glycol, dipropylene glycol, 1,4-cyclohexane dimethanol, dimethylol hydantoin, and 1,6-hexanediol.

The preferred aromatic dicarboxylic acids are isophthalic acid, terephthalic acid and benzophenone dicarboxylic acid.

The preferred aromatic tricarboxylic acid is trimellitic and/or the anhydride thereof.

A variety of solubilizing reactants for the second stage of the alkyd cook may be employed. They are di- or tricarboxylic acids or anhydrides of the aliphatic, cycloaliphatic or aromatic types and include the following:

DIACIDS (a) Aliphatic—succinic acid, glutaric acid, adipic acid, azelaic acid, sebacic acid, maleic acid or its anhydride, fumaric acid, itaconic acid or its anhydride, tetrapropenyl succinic anhydride, etc.

(b) Cycloaliphatic—tetrahydrophthalic anhydride, hexahydrophthalic anhydride, 1,4-cyclohexanedicarboxylic acid, and 3,6-endo-methylene-4-tetrahydrophthalic anhydride.

(c) Aromatic—phthalic acid or its anhydride.

TRIACIDS

Aromatic—trimellitic anhydride

As seen from the above listings, the terms, "diacids" and "triacids" are used generically to include anhydrides. The terms, "dicarboxylic acid," "tricarboxylic acid" and the like are intended to be similarly generic to anhydrides.

Oils which can be used in making the oil-modified alkyds include soybean oil, cottonseed oil, linseed oil, safflower oil, corn oil, tung oil, menhaden oil, tall oil, castor oil, palm oil, coconut oil, perilla oil, rapeseed oil, grapeseed oil, sunflower oil, oiticica oil, etc.

The fatty acids preferably contain 8 to 18 carbon atoms, and may be saturated or unsaturated types, and include the following:

Saturated—pelargonic acid, octanoic acid, lauric, myristic, palmitic acid, stearic acid, and isodecanoic acid.

Unsaturated—either unconjugated or conjugated types, such as linoleic acid, linolenic acid, ricinoleic acid, oleic acid, elaeostearic acid, and fatty acid mixtures from soybean oil, cottonseed oil, linseed oil, and tall oil.

The alkyd solids are formed by reacting 3 to 60 weight percent of the alcoholic component (diols and/or triols) with 40 to 97 weight percent of acid reactants. When trimellitic anhydride is admixed with an aromatic dicarboxylic acid, e.g. isophthalic acid or terephthalic acid, (for reaction with the alcoholic component), 0.1 to 0.5 mole of trimellitic anhydride (TMA) is reacted for each mole of the said aromatic dicarboxylic acid. When a mixture of aliphatic (and/or cycloaliphatic) polycarboxylic acids with the dicarboxylic aromatic acid is used, the aliphatic is used in an amount of 0.1-0.7 mole per mole of said dicarboxylic aromatic acid. When mixtures of TMA, said aliphatic dicarboxylic acid and/or cycloaliphatic diacid and said aromatic dicarboxylic acid are used, the mixture comprises 25 to 75 mole percent of the combined amounts of said TMA, and said aliphatic and/or said cycloaliphatic diacid.

Representative fatty oils which may be used in the present invention include the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids, including fatty acids may be illustrated by the following: abietic acid, benzoic acid, caproic acid, caprylic acid, castor fatty acid, cocoanut fatty acid, cottonseed fatty acid, crotonic acid, DCO FA, i.e. primarily

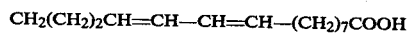

$$CH_2(CH_2)_2CH=CH-CH=CH-(CH_2)_7COOH$$

2-ethyl hexoic acid, lauric acid, linoleic acid, linolenic acid, linseed FA, oleic acid, pelargonic acid, rosin acid (A.N. 165), soya FA, tall oil FA (A.N. 195, A.N. 192), etc.

Percentage oil length normally refers to the oil portion of the resin expressed as a percentage of the total fatty acid in the resin taken together with the weight of a polyol needed to completely esterify this fatty acid (minus weight of evolved water of esterification) expressed as a percentage of the total solids content of the finished resin.

Thus, where a fatty acid is present in the formulation, its oil length is calculated as a fully esterified ester of the polyol.

Where an oil is employed, the oil length is calculated as follows:

$$\text{Percent oil length} = \frac{\text{Wt. fatty acid glyceride (or oil)}}{\text{Total resin weight} - \text{water of esterification}} \times 100$$

Where less than a full glyceride is employed, for example a mono- or a di-glyceride, the oil length is calculated as the full glyceride produced during esterification.

Thus, for purposes of this invention an oil modified imidized polyester includes imidized polyesters modified with fatty acids as well as oils. The preferred embodiment of this invention is an imidized polyester resin prepared from a fatty acid. The oil-modified imidized polyesters may be of long, medium or short oil content; where a fatty acid is employed, it may also be long, medium or short, i.e. having proportionate ranges of fatty acids calculated as glycerides and/or isocyanurates as compared to the oils. These terms have the following meanings: Short oil 25–40%; medium oil 40–55%; long oil 55–78%, weight of oil based on total weight of the imidized polyester formulation including the oil. Lesser amounts of oil such as 25% or lower, or greater amounts of oil, such as 75–80% or greater, may also be employed in certain instances.

The aromatic tricarboyxlic acid or anhydride thereof used in the polycarboxylic acid component in this invention is represented by the general formula

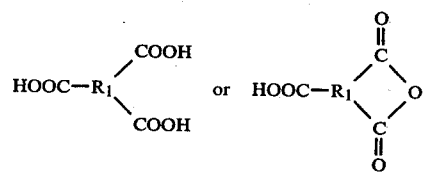

wherein $R_1$ is a trivalent aromatic group, in which $R_1$ is selected from the group consisting of

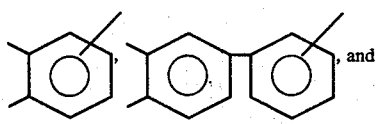, and

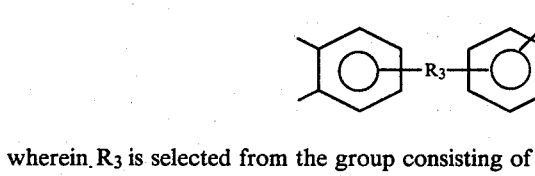

wherein R₃ is selected from the group consisting of $$-CH_2-, -O-, -S-, -SO_2-, -CO-, \text{ and } -\underset{CH_3}{\overset{CH_3}{\underset{|}{\overset{|}{C}}}}-$$

Typical examples of aromatic tricarboxylic acids or anhydride thereof are trimellitic acid (or the anhydride thereof), hemimellitic acid (or the anhydride thereof), trimesic acid (or the anhydride thereof), 3,4,3'(or 3,4,4')-diphenyltricarboxylic acid (or the anhydride thereof, 3,4,3'(or 3,4,4')-diphenylmethanetricarboxylic acid (or the anhydride thereof), 3,4,3'(or 3,4,4')-diphenylether tricarboxylic acid (or the anhydride thereof), 3,4,3'(or 3,4,4')-diphenylsulfidetricarboxylic acid (or the anhydride thereof), 3,4,3'(or 3,4,4')-diphenylsulfonetricarboxylic acid (or the anhydride thereof), 3,4,3'(or 3,4,4')-diphenylketonetricarboxylic acid (or the anhydride thereof), 3,4,3'(or 3,4,4')-diphenylpropanetricarboxylic acid (or the anhydride thereof), and mixtures thereof.

The trivalent or divalent organic carboxylic acid or the anhydride thereof which can be used together with the above aromatic tricarboxylic acid or the anhydride in the polycarboxylic acid component is preferably an organic dicarboxylic acid or the anhydride thereof expressed by the general formula

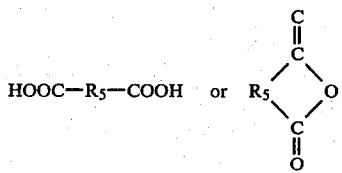

in which R₅ is a divalent organic group selected from the group consisting of

in which n₂ is an integer of 1 to 8.

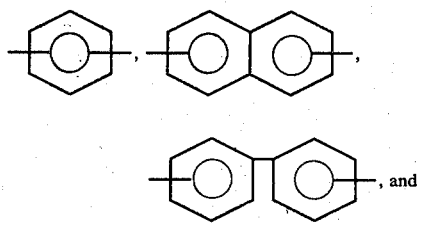, and

-continued

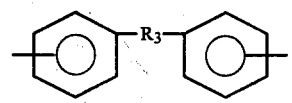

in which R₃ is selected from the group consisting of $$-CH_2-, -O-, -S-, -SO_2-, -CO-, \text{ and } -\underset{CH_3}{\overset{CH_3}{\underset{|}{\overset{|}{C}}}}-$$

Typical examples of dicarboxylic acids and anhydrides thereof are succinic acid, succinic anhydride, adipic acid, malonic acid, sebacic acid, phthalic acid, phthalic anhydride, isophthalic acid, terephthalic acid, naphthalene-1,4(or 1,5 or 2,6, etc.)-dicarboxylic acid having the formula

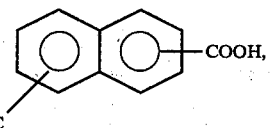

3,3'(or 4,4', etc.)-dicarboxydiphenyl having the formula

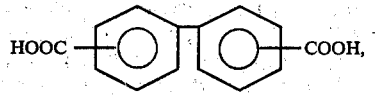

3,3'(or 4,4', etc.)-dicarboxydiphenylmethane, 3,3'(or 4,4', etc)-dicarboxydiphenyl ether, 3,3'(or 4,4', etc.)-dicarboxydiphenyl sulfide, 3,3'(or 4,4', etc.)-dicarboxydiphenyl sulfone, 3,3'(or 4,4', etc.)-dicarboxydiphenylketone, 3,3'(or 4,4', etc.)-dicarboxydiphenyl propane having the formula

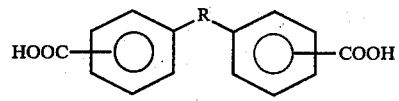

wherein R represents a methylene group, in oxygen atom, a sulfur atom, an —SO₂— group, a $$-\overset{O}{\overset{\|}{C}}- \text{ group or } -\underset{CH_3}{\overset{CH_3}{\underset{|}{\overset{|}{C}}}}- \text{ group}$$

or mixtures thereof.

The aromatic tricarboxylic anhydride used to prepare the imide ring is selected from the general formula

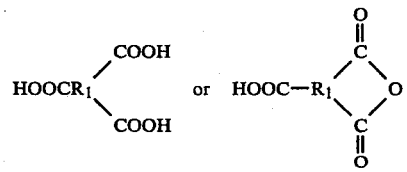

in which $R_1$ is selected from the group consisting of

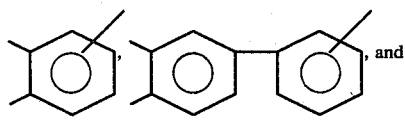

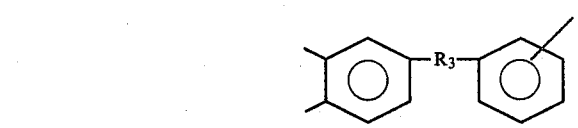

wherein $R_3$ is selected from the group consisting of $$-CH_2-, \ -O-, \ -S-, \ -SO_2-, \ -CO- \ \text{and} \ -\underset{\underset{CH_3}{|}}{\overset{\overset{CH_3}{|}}{C}}-.$$

Typical examples of aromatic tricarboxylic anhydrides are trimellitic anhydride, hemimellitic anhydride, 3,4,3'(or 3,4,4')-diphenyltricarboxylic anhydride, 3,4,3'(or 3,4,4')-diphenylmethanetricarboxylic anhydride, 3,4,3'(or 3,4,4')-diphenylethertricarboxylic anhydride, 3,4,3'(or 3,4,4')-diphenylsulfidetricarboxylic anhydride, 3,4,3'(or 3,4,4')-diphenylsulfonetricarboxylic anhydride, 3,4,3'(or 3,4,4')-diphenylketonetricarboxylic anhydride, 3,4,3'(or 3,4,3')-diphenylpropanetricarboxylic anhydride, and mixtures of these anhydrides.

The organic diamines of the general formula $$NH_2-R-NH_2$$

used to obtain the above imide ring are selected from those of the above general formula in which $R_2$ is selected from the group consisting of $$-CH_2-_{n1}$$

wherein $n_1$ is an integer of 1 to 6,

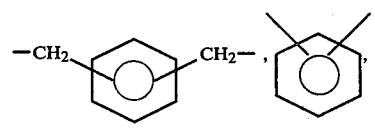

-continued

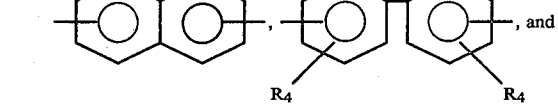

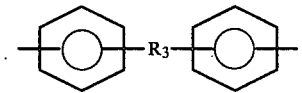

wherein $R'_3$ is selected from the group consisting of $$-CH_2-, \ -O-, \ -S-, \ -SO_2-, \ -CO-, \ -\underset{\underset{CH_3}{|}}{\overset{\overset{CH_3}{|}}{C}}- \ \text{and}$$

$$-N\overset{O}{\underset{H}{\|}}C-; \ \text{and} \ R_4$$

is selected from the group consisting of a hydrogen atom, an alkoxy group, an alkyl group and a halogen atom.

As the imide forming components, there can be used (a) anhydrides, such as trimellitic anhydride, etc. and (b) polyamines, preferably aromatic amines, such as methylene dianiline, oxydianiline, phenylene diamines, etc. Additional aromatic dicarboxylic anhydrides include 3,4,3'-benzophenone dicarboxylic anhydride, hemimellitic anhydride and pyromellitic dianhydride. Other polyimide forming anhydrides are shown in Meyer U.S. Pat. No. 3,426,098. The preferred anhydride is trimellitic anhydride.

Other polyamines include 3,3'-diamino-diphenyl, benzidine, 1,4-diaminonaphthalene, p-phenylene diamine, ethylene diamine, nonamethylene diamine, hexamethylene diamine, diaminodiphenyl ketone, bis(4-aminophenyl)-α,α'-p-xylene, m-phenylene diamine, m-xylylene diamine, 4,4'dicyclohexylmethane diamine, diaminodiphenyl sulfone, octamethylene diamine, p-xylene diamine, 3,3'-dichlorobenzidine, 3,3'-dimethylbenzidine, 3,4'-diaminodiphenyl ether, 4,4'-diaminodiphenyl propane, 3,3'-diaminophenylsulfone.

The preferred diamines are methylene dianiline and oxydianiline.

Reactants (a) and (b) are usually employed in an amount of approximately two (2) moles of (a) per mole of (b) to form the diimide-diacid. This reaction product may be represented as follows:

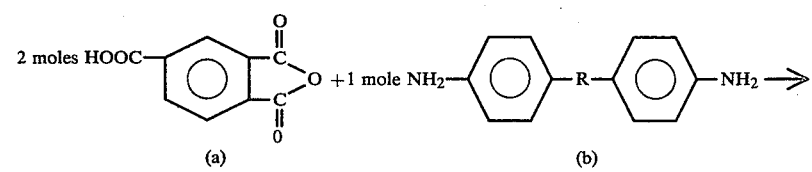

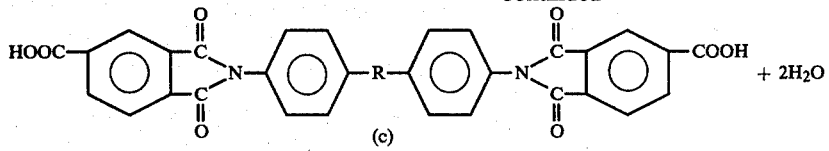

$$+ 2H_2O$$

where R is $CH_2$ in the case of methylene dianiline or the oxygen atom (O) in the case of oxydianiline.

Depending on many factors, the range of imide content can vary widely, is at least about 0.1% by wgt. such as from about 0.1% to 40%, for example from about 1 to 30%, but preferably from 2 to 15%. The % by wgt. of imide is calculated as the wgt. percent of Formula (c) above in the total wgt. of the resin.

The oil-modified imidazed polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, trifunctional and tetrafunctional phenols, naphthols, bisphenols, salicylic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenol-glycerol resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

Suitable resins can be prepared from difunctional phenols and aldehydes. For the preparation of such resins, suitable phenols include: Para- and ortho-cresols; para- and ortho-ethyl-phenol; 3-methyl-4-ethyl-phenol; 3-methyl-4-propyl-phenol; 2-ethyl-3-methyl-phenol; 2-propyl-3-methyl-phenol; para- and ortho-propyl-phenol; para-tertiary-butylphenol; para-secondary-butylphenol; para-tertiary-amyl-phenol; para-secondary-amyl-phenol; para-tertiary-hexyl-phenol; paraisooctyl-phenol; ortho-phenyl-phenol; para-phenyl-phenol; thymol; ortho-benzyl-phenol; para-benzyl-phenol; para-cyclohexyl-phenol; para-tertiary-decyl-phenol; para-dodecyl-phenol; para-tetradecyl-phenol; para-octadecyl-phenol; para-nonylphenyl; para-methyl-phenol; para-eicosanyl-phenol; paradocosanyl-phenol; para-tetracosanyl-phenol; para-betanaphthyl-phenol; para-alpha-naphthyl-phenol; parapentadecyl-phenol.

For the production of aldehyde-linked resins, including not only those derived from difunctional phenols, but also those derived from trifunctional and tetrafunctional phenols (e.g. bis-phenols) and modified phenolic resins involving aldehyde-derived bridges, any aldehyde capable of forming a methylol or a substituted methylol group and having not more than 8 carbon atoms is satisfactory so long as it does not possess some other functional group or structure which will conflict with the resinification reaction but the use of formaldehyde, in its cheapest form of an aqueous solution, for the production of the resins is particularly advantageous.

Useful aldehydes, in addition to formaldehyde, are acetaldehyde, propionaldehyde, butyraldehyde, 2-ethylhexanal, ethylbutyraldehyde, heptaldehyde, and benzaldehyde, furfural and glyoxal.

The compositions of this invention can be employed to prepare insulating varnishes and in particular varnishes yielding electrical conductor coatings have improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors and other electrical equipment.

In preparing the insulating varnishes of the present invention, in addition to the oil modified imidized polyester resins there is normally used phenol-aldehyde resin. The phenol-aldehyde resin gives the varnish heat reactivity, improves electrical properties, aids in the cure and lends hardness and abrasion resistance to the product. Among the phenol-aldehyde resins which can be used are p-tertiary amylphenol-formaldehyde, p-tertiary butylphenol-formaldehyde, p-tertiary octylphenolformaldehyde, p-phenylphenol-formaldehyde, 2,2-bis (p-hydroxyphenyl) propaneformaldehyde and o-tertiary butylphenol-formaldehyde. Other suitable phenol-formaldehyde resins are shown in Honel U.S. Pat. No. 1,800,296. Substituted phenols alone or in conjunction with phenols can be used in forming the oil-soluble phenolic resin. While the phenolic resin can be prepared using an acid catalyst, they are generally prepared using alkaline catalysts as is well known in the art. Thus, the p-tertiary butylphenolformaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The phenol-formaldehyde resins are of the heat-reactive type. The phenol-formaldehyde resin is usually employed in an amount of 5% to 70% by weight of the total of the oil modified imidized polyester resin and phenolic resin, such as 5-40%, but preferably 10-30%. Increasing the amount of phenolic resin speeds the cure but also sacrifices aging characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g., bisphenol A-epichlorohydrin resin, although the preferred heat-reactive resins are the phenolic resin since they impart the best combination of improved properties, all things considered. Rosin-modified phenolics are also advantageously employed.

The insulating varnishes of the instant invention have properties which warrant their use as class H temperatures. They can withstand temperatures in excess of 180° C. for the normal life of a motor or transformer in which they are utilized. The cured varnishes are highly resistant to oil, chemicals and moisture.

The varnishes in accelerated aging tests have retained their toughness, flexibility, excellent bonding strength and high dielectric properties after heat aging for as long as 20,000 hours at over 200° C., based on extrapolated values. The varnishes can be applied by vacuum impregnation or free dip system. They cure readily under infra-red heat or in forced air ovens. Baking is normally done at 275° F. to 400° F., although lower temperatures can be used.

A typical insulating varnish is prepared by formulating the oil modified imidized polyester of this invention with a phenolic resin, usually in a dilute solution for example from about 25-75% solids, but preferably as a 50% solution. Other conventional additives can be employed, for example a drier or curing agent may be employed, for example cobalt, calcium, manganese, zinc, lead, titanium, cadmium, boron, thorium, etc., salts, such as the naphthenates, octoates, tallates, etc., thereof, for example in ratios of 1-10 parts or more of drier per 1000 parts by weight of imidized polyester resin.

TRIAZINE DERIVATIVE COMPONENT

The triazine component may be a melamine or benzoguanamine reaction product with formaldehyde such that two or more methylol groups are formed which may be left intact or partially or fully etherified with a variety of alcohols. These products may be used as monomers or low molecular weight polymers possessing water solubility.

Etherification of the methylol groups of the triazine-formaldehyde derivative is conventionally undertaken by condensing said derivative with an alcohol, e.g. methanol or butanol, in the presence of an acid catalyst.

Triazine products with varying methylol contents in which the hydroxyl groups are in the free or non-etherified state provide varnishes with excellent properties, but offer limited package or storage stability. Speed of condensation or cure response in the case of the etherified methylol group increases with increasing volatility of the alcohol used in the synthesis of the aminoplast. Methanol is more volatile than n-butanol, and those aminoplast crosslinkers, with methanol as the etherifying agent such as hexamethoxymethylmelamine, have a faster response than those with butanol.

Generally, the methylated versions of melamine- or benzoguanamine-formaldehyde derivatives cure faster, provide better compatibility with other coreactants, are more soluble in water, and confer greater chemical resistance to the final baked film. Due to the greater functionality of the melamine type of crosslinkers better hardness, bond strength and moisture resistance is achieved over the benzoguanamine crosslinkers.

The presence of acidity via free carboxyl groups in the alkyd coreactant acts as a "built in" catalyst in hastening crosslinking with the aminoplast and phenoplast components therein.

In addition to hexamethoxymethylmelamine (HMMM), various other commercially available triazine derivatives were tested. They included the Resimenes (sold by Monsanto); Cymels (sold by American Cyanamid) and Uformite (sold by Rohm and Haas). Resimenes are amino resins and include products which are derived from the reaction of melamine, formaldehyde, and either n-butanol, isobutanol or methanol. Resimenes 730 and 740 are methylated melamines; Resimene 755 is a mixed ether (methyl and butyl) melamine, as is Resimene 764. Resimene 760 is a butylated melamine. Cymel is a trademark for a series of melamine-formaldehyde resin products. Cymel 350 is a methylated monomeric melamine-formaldehyde product, while Cymel 1116 is a methylated-ethylated-monomeric melamine-formaldehyde product. Cymel 370 and Cymel 380 are both polymeric melamine-formaldehyde products which have been methylated but still contain high methylol content. Cymel 1123 is a monomeric benzoguanamine-formaldehyde adduct which has been methylated and ethylated, while Cymel 1125 is the polymeric counterpart of 1123; both Cymel 1123 and 1125 contain very low methylol content.

Uformite is the trademark for melamine formaldehyde and triazine condensates, supplied in aqueous solutions or solutions in volatile solvents.

All the triazine products were compatible in the various varnishes both in solution and in the cured state.

To solubilize the inherently water-insoluble resinous coating components, the alkyd and the phenolic resin are separately predissolved in a solvent (or solvent mixtures) to a solids level ranging from 50 to 90% to facilitate the preparation of the final coating. Other techniques of coating preparation may be employed whereby the molten alkyd is added to a mixture of water, amine, cosolvent, phenolic resin and aminoplast and carefully adjusted to the desired liquid specifications.

In order to compound the coatings in a more facile manner the alkyd is diluted to 80% solids with a solvent to form a concentrate. The phenolic resin is treated in the same manner, except that its solids may range from 50 to 80%. The aminoplast is used at 80 to 100% solids, and its solvent may vary from water to a variety of primary, secondary or tertiary alcohols.

The incorporation of a polar solvent, as a component of a water/solvent blend, enhances the solubility of these coating compositions which may be soluble in a water/amine mixture alone. The solvent not only aids the package stability of the coating, but enhances the flow of the liquid film so that a smooth, continuous baked film is obtained.

Typical solvents that may be incorporated are polar solvents which are water-miscible. They include glycol ethers, glycol diethers, glycol ether acetates, diacetone alcohol, alcohols and ketones.

The alkyds and phenolics are soluble in a variety of these solvents, and the various examples typify this.

The amount of cosolvent incorporated along with water may range from 20 to 65% of the total blend and preferably 20 to 50%. The cosolvent level is dependent on the amount and type of phenolic resin employed.

The three-component compositions of the invention and each component thereof can be dissolved in aromatic hydrocarbons or aromatic hydrocarbons admixed with aliphatic hydrocarbon and/or water immiscible solvents, as non-aqueous systems. Typical aromatic hydrocarbons include toluene, xylene, ethyl benzene and other alkylated benzenes. Typical aliphatic hydrocarbons are those including hexane, heptane, octane and higher alkanes of straight or branched chain. Typical water immiscible solvents include esters, ketones, ethers, alcohols.

To render these coating compositions water-soluble, various amines may be employed that react with the available carboxyl groups present in the alkyd and phenolic components to form amine salts thereof that are soluble in water. These amines may be of the alkyl, alkanolamine, or morpholine types. In general the tertiary amines work best from the standpoint of fast cure, and confer the least moisture sensitivity in the resultant baked film.

A sufficient quantity of amine is employed to raise the pH of the aqueous solution to a range of 7–9 and preferably 7.5 to 8.5.

Coatings prepared from formulations produced in accordance with the foregoing description are characterized in that they are:

(a) water-soluble upon neutralization with an amine,
(b) heat-curable protective coatings having superior moisture resistance, relatively high bond strengths and good thermal resistance, and
(c) multi-component mixtures containing imidized alkyd, phenolic and amino resins along with cosolvents, amines and water where the water content exceeds 20% of the total weight.

The varnishes of the invention are usually formed by admixing the following components at room or ambient temperature:

(a) alkyd concentrate at about 80% solids in a glycol ether, or other polar solvent,
(b) phenolic resin solution at 50–80% solids in a glycol ether, or added as a hard resin to the warm alkyd concentrate.
(c) aminoplast or triazine curative at 80–100% solids in a primary alcohol or water
(d) tertiary amine at about 1.5–6% by weight of the varnish.
(e) Water generally forms from about 30–75% of the total volatile content consisting of water, cosolvent and amine.
(f) The amount of total cosolvent ranges from about 20 to 65% of the total volatile content consisting of water, cosolvent and amine.

Typical examples of tertiary amines are:
triethyl amine, trimethyl amine, tributyl amine, triethanolamine,
N,N-dimethyl ethanolamine (a preferred tertiary amine),
N,N-diethyl ethanolamine,
N,N-diisopropyl ethanolamine,
N,N-dibutyl ethanolamine,
triisopropanolamine,
N,N-dibutyl isopropanolamine,
N-methyl diethanolamine (a preferred tertiary amine),
N-ethyl diethanolamine, N-propyl diethanolamine,
N-methyl morpholine,
N-ethyl morpholine,
N-(2-hydroxyethyl) morpholine,
2-amino-2-methyl 1-propanol,
2-dimethylamino-2-methyl 1-propanol.

A sufficient quantity of amine is employed to raise the pH of the aqueous solution to a range of 7–9, and preferably 7.5–8.5.

The incorporation of a polar solvent, as a minor component of a water/co-solvent blend, enhances the flow during cure of the enamel, and, ultimately, the smoothness and concentricity of the resultant baked film. The amount of polar solvent, when present, is preferably 10 to 25%.

Typical polar solvents that may be used are principally water-miscible, although cresylic acid may be incorporated in judicious amounts as well. They are:
N-methyl pyrrolidone,
butyrolactone,
dimethyl sulfoxide,
diacetone alcohol,
dioxane,
glycol ethers, e.g., methoxyethanol, ethoxyethanol, butoxyethanol, diethylene glycol monomethyl ether,
alcohols, e.g., ethyl alcohol, isopropyl alcohol, methyl alcohol, glycols such as ethylene glycol, diethylene glycol, triethylene glycol, trimethylene glycol, propylene glycol, dipropylene glycol,
ketones, e.g., acetone, methyl ethyl ketone,
glycol ether acetates, e.g., methoxyethyl acetate, ethoxyethylacetate butoxyethyl acetate,
glycol diethers, e.g., diethylene glycol dimethyl ether, diethylene glycol diethyl ether.

The amount of cosolvent incorporated along with water may range from 0–40% of the total blend, and preferably 10–25%, e.g. 20%

As a result of the use of low molecular weight prepolymers the solids of either water- or solvent-based enamels are much higher than the conventional solvent-based enamels, namely in the 50–55% solids range for both of the former versus 30–35% for the latter. The general solids range may be 40–65%, and the preferred range is 45–60%.

The compositions of this invention can be employed to prepare insulating varnishes and in particular varnishes yielding electrical conductor coatings have improved properties. These varnishes are particularly valuable for impregnating armature and field coils of motors and for both power and distribution transformers of either the oil or dry type where long life at high operating maximum penetration is required. These varnishes provide maximum penetration in the rightest wound coils. They are particularly suitable for impregnating motor stators, rotors and other electrical equipment.

The following summarize the above, in relation to the preparation of the compositions of this invention used as insulating material such as varnishes. The reaction temperature at the alkyd stage is about 100° to 300° C., preferably 160° to 220° C. When the reaction is performed at this temperature for several hours, water distills off, and the reaction mixture gradually becomes a viscous resinous product with a decrease in acid value. The reaction is stopped when the acid value of the product is about 10 to 30, preferably about 15 to 25.

A suitable amount of the polyimide component in the preparation of the carboxyl-containing polyesterimide reson (A) at this stage is usually about 20 to 70% by weight, based on the total amount of the polyester component and the polyimide component.

The carboxyl-containing polyesterimide resin so obtained is then reacted with the solubility reactant such as trimellitic acid sufficient to give the desired acid number such as from about 40 to 80, but preferably from about 55 to 65.

When the reaction at this stage is performed usually at about 100° to 300° C., preferably 130° to 200° C., water distills off. The main reaction at this time is an imidization reaction between trimellitic anhydride and the organic diamine, but esterification occurs by the reaction of the carboxyl TMA (or the imide-forming derivative thereof) with the hydroxyl groups of the carboxyl-containing polyesterimide resin to increase the molecular weight of the resin. In some cases, amide linkages can be formed by the reaction of the amino groups with the carboxyl groups of the carboxyl-containing polyesterimide resin.

At this point, a cross-linking resin (which had been thinned with a suitable solvent), a volatizable base, such as an amine, and water are added to form a water-soluble heat-resistant insulating varnish.

The water-soluble heat-resistant insulating varnish so obtained contains mainly ester groups and imide groups in the molecule. Since the resin in the form of a salt with the basic compound such as an amine dissociates at the time of baking, cross-linking proceeds within the molecule and between the molecules thereby to provide a film having superior insulating properties.

As previously stated, the reaction is stopped when the acid value of the reaction product usually becomes about 30 to 150. If the acid value is less than about 30, the resin does not become water-soluble even by addition of a basic compound such as an amine, and the varnish sometimes becomes turbid. If the acid value is above about 150, unreacted materials remain, and when the resulting water-soluble heat-resistant insulating varnish is baked, it is difficult to obtain a film having superior mechanical and electrical properties.

The compound to be added in order to render the resin water-soluble is preferably a basic compound volatilizable at the time of baking the water-soluble heat-resistant insulating varnish. Typical examples of volatile basic compounds include ammonia, trialkylamines such as trimethylamine, triethylamine or triethylamine or tributylamine, N-alkyldiethanolamines such as N-methyldiethanolamine, N-ethyldiethanolamine or N-propyldiethanolamine, N,N-dialkylethanolamines such as N,N-dimethylethanolamine, or N,N-diethylethanolamine, N,N-dibutylethanolamine, monoethanolamine, diethanolamine, triethanolamine, and mixtures thereof.

The amount of the volatilizable basic compound is an amount sufficient to render the resin water-soluble, that is, an amount sufficient to neutralize the carboxyl groups in the resin. It is not necessary to convert all of the residual carboxyl groups into salts, and therefore, it is sufficient if the amount of the volatilizable basic compound is only larger than that which renders the resin water-soluble. Even if amines are added in excess, heating the varnish at about 100° C. can result in the removal of the excess. The amount added generally is about 0.3 to 3 equivalents based on the residual carboxyl groups in the resin.

The pH of the resulting water-soluble heat-resistant insulating varnish is usually about 5 to 9, and preferably it is adjusted to 6 to 8.

The functional characteristics of varnishes according to the present invention will vary to some extent depending upon starting materials and the degree of polymerization employed, but generally the concentration of the components contained in the aqueous solution can range from about 30 to about 55% by weight (measured as solid content at 135° C.±2° C. for 3 hours) with the viscosity being in the range of about 1 to about 100 poises (measured at 25° C. using a Brookfield type viscosimeter).

The water-soluble heat-resistant insulating varnish so obtained provides a film of good properties even when the solvent is solely water. It is sometimes effective, however, to replace up to about 30% by weight of the water with a water-soluble high-boiling solvent since this renders film formation easy, and provides a film having a smooth surface. Examples of suitable water-soluble high-boiling solvents are ethylene glycol monomethyl ether, ethylene glycol monoethyl ether, ethylene glycol monoisopropyl ether, ethylene glycol monobutyl ether, ethylene glycol monoisobutyl ether, diethylene glycol monomethyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monoisopropyl ether, triethylene glycol monobutyl ether, triethylene glycol monoisobutyl ether, ethylene glycol monomethyl ether acetate, ethylene glycol monoethyl ether acetate, ethylene glycol, propylene glycol, diethylene glycol, dipropylene glycol, triethylene glycol, glycerol, N,N-dimethylformamide, N,N-diethylformamide, N,N-dimethylacetamide, N,N-diethylacetamide, N-methyl-2-pyrrolidone, N,N-dimethylmethoxyacetamide, N-methylcaprolactam, and mistures of these solvents.

The alkyd is prepared by reacting the following reactants in the ratio indicated.

|  | Mole Percent Broad Range | Intermediate Range | Preferred Range |
| --- | --- | --- | --- |
| Fatty acid | 10–30 | 15–25 | 18–20 |
| Diols | 0–15 | 5–10 | 6–8 |
| Polyols | 10–40 | 30–36 | 32–34 |
| Aromatic Dicarboxylic Acid | 10–30 | 15–25 | 18–20 |
| Aliphatic Dicarboxylic Acid | 0–10 | 2–6 | 3–5 |
| 1st Tricarboxylic Acid | 1–10 | 2–6 | 3–5 |
| Diamine | 1–8 | 1–4 | 1–3 |
| Final Tricarboxylic Acid | 1–15 | 5–10 | 7–9 |

The composition of this invention comprises the following
(1) oil modified alkyds
(2) imides
(3) curing resins
(4) other components such as curing agents, driers, water solutizers, etc.

The wgt. percent of the components of this invention may be summarized as follows:

|  | Broad Range about | Intermediate Range about | Preferred Range about |
| --- | --- | --- | --- |
| Oil modidied Alkyds | 50–90 | 60–80 | 65–75 |
| Imides | 1–20 | 3–13 | 5–10 |
| Curing Resins | 5–50 | 10–40 | 20–30 |

These compositions may be dissolved in water by any suitable means such as by the use of tertiary amines to yield the following components in percentages by wgt.

|  | Broad Range | Intermediate Range | Preferred Range |
| --- | --- | --- | --- |
| Oil modified Alkyd + Imides + Curing resins | 25–85 | 40–60 | 50–55 |
| Amine Solubilizers | 1–10 | 1–5 | 2–4 |
| Water | 15–75 | 35–60 | 40–50 |

The following examples are presented for purposes of illustration and not of limitation.

In order to compare the improved properties of the imidized polyesters of this invention, they are compared to corresponding unimidized polyesters.

| Percent by Weight | Ex. I Unimidized Polyester | Ex. II Polyester 8% Imide | Ex. III Polyester 10% Imide |
|---|---|---|---|
| Tall oil fatty acids (TOFA) | 13.38 | 12.58 | 11.91 |
| Neopentyl Glycol (NPG) | 1.93 | 1.82 | 1.72 |
| Trimethylol Ethane (TME) | 9.99 | 9.39 | 8.89 |
| Isophthalic Acid (IPA) | 9.26 | 7.76 | 6.40 |
| Adipic Acid | 1.55 | 1.46 | 1.38 |
| Trimellitic Anhydride (TMA I) | 4.081 | 2.18 | 4.13 |
| Methylene Dianiline (MDA) | — | 1.16 | 2.13 |
| Trimellitic Anhydride (TMA II) | — | 3.84 | 3.63 |
| Ethylene Glycol Mono Butyl Ether | 21.35 | 21.35 | 21.35 |
| Phenolic resin | 5.27 | 5.27 | 5.27 |
| Melamine resin | 7.03 | 7.03 | 7.03 |
| Dimethylethanolamine | 2.99 | 2.99 | 2.99 |
| Water | 23.09 | 23.09 | 23.09 |
| 12% Manganese drier | .08 | .08 | .08 |

The preparations of the above three resins are the same except that in Ex. I Trimellitic Anhydride II and Methylene Dianiline are not present.

In Ex. I charge TOFA, NPG, TME, IPA, Adipic, TMA I to a flask. In Exs. II and III, MDA and TMA II are also added; heat this to 250° C. and hold for an acid number of 15-25. Cool to 125° C. then add the second TMA and reheat to 175° C. Hold for an acid number of 60. Start thinning with the ethylene glycol mono butyl ether; then when the temperature reaches 125° C., add the phenolic resin; hold for one hour at 120° C. and continue cooling to 75° C. and add the melamine resin. When at 65° C. add the DMEA and water, then the manganese drier. Adjust the pH to 7.5 to 8.0.

The three examples have the following physical characteristics.

|  | Ex. I | Ex. II | Ex. III |
|---|---|---|---|
| Wt/gal | 8.70 | 8.77 | 8.73 |
| Viscosity | 350 cps | 420 cps | 530 cps |
| Non Volatile | 48.0% | 46.9% | 47.) % |
| pH | 7.5 | 7.5 | 7.5 |
| Flash Point | over 100° C. | over 100° C. | over 100° C. |

The resulting products were compared in accord with the following tests.

Bond Strength-ASTM D-2519

All coils were Polyester-amide-imide construction which were reverse dipped and cured with the above composition for 2 hrs at 150° C. each dip. Then each was cured for an additional hour at the temperature indicated. The results were as follows.

|  | Ex. I | Ex. II | Ex. III |
|---|---|---|---|
| ADDITIONAL CURE AFTER INITIAL 2 HR CURE OF 150° C. | BOND STRENGTH | | |
| Addn 1 Hour Cure at 180° C. | | | |
| Broke at 25° C. | 30.60 | 29.47 | 27.25 |
| Broke at 150° C. | 2.69 | 3.60 | 3.09 |
| Addn 1 Hour Cure at 200° C. | | | |
| Broke at 25° C. | 35.70 | 37.57 | 36.85 |
| Broke at 150° C. | 2.76 | 5.91 | 7.08 |
| Addn 1 Hour Cure at 220° C. | | | |
| Broke at 25° C. | 42.80 | 46.44 | 52.32 |
| Broke at 150° C. | 2.79 | 8.03 | 8.85 |

THERMAL AGING HOURS TO FAILURE

|  | Ex. I | Ex. II | Ex. III |
|---|---|---|---|
| Bond Strength | | | |
| 240° C. | 2318 | 2473 | 2719 |
| 255° C. | 1417 | 920 | — |
| 260° C. | — | — | 881 |
| Thermal value 20,000 hours | 210.9° C. (actual) | 210.9° C. (approx.) | 208.0° C. (approx.) |
| Twisted Pair | | | |
| 240° C. | 1545 | 1486 | 1477 |
| 255° C. | 642 | 573 | — |
| 260° C. | — | — | 365 |
| Thermal value 20,000 hours | 180.1° C. (actual) | 203.0° C. (approx.) | 206.4° C. (approx.) |

Although the utility of the oil modified imidized polyester resins of this invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in protective coating applications by applying the resin in a suitable solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates. They are useful as coatings for tapes, glass cloth, fabrics, paper, as mica binders, as asbestos binders, as electrical tubing and sleeving varnishes, as a laminating varnish, etc.

I claim:

1. A water soluble and/or dispersible composition comprising a fatty oil or fatty acid modified, imidized polyester, said polyester being derived from aliphatic, cycloaliphatic or aromatic diols; polyhydroxy-alkanes other than diols; aliphatic, cycloaliphatic and/or aromatic dicarboxylic acids; and aromatic tricarboxylic acids.

2. The composition of claim 1 where the diol is an alkylene glycol and the polyhydroxy-alkane other than diols is a trihydroxyalkane.

3. The composition of claim 2 where the glycol is neopentyl glycol, the polyhydroxy-alkane is trimethylol ethane; the dicarboxylic acid is a phthalic acid and/or adipic acid, and the tricarboxylic acid is trimellitic anhydride.

4. The composition of claim 3 where the imidized component is derived from the reaction product of the trimellitic anhydride and

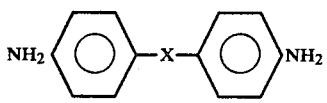

where X=O or —CH$_2$—.

5. The composition of claim 4 where about 2 moles of trimellitic anhydride is reacted with about 1 mole of diamine.

6. The composition of claim 5 where the imidized polyester is modified by tall oil fatty acid.

7. The composition of claim 1 which also contains a curable resin.

8. The composition of claim 2 which also contains a curable resin.

9. The composition of claim 3 which also contains a curable resin.

10. The composition of claim 4 which also contains a curable resin.

11. The composition of claim 5 which also contains a curable resin.

12. The composition of claim 6 which also contains a curable resin.

13. A water system containing the composition of claim 1.

14. A water system containing the composition of claim 2.

15. A water system containing the composition of claim 3.

16. A water system containing the composition of claim 4.

17. A water system containing the composition of claim 5.

18. A water system containing the composition of claim 6.

19. A water system containing the composition of claim 7.

20. A water system containing the composition of claim 8.

21. A water system containing the composition of claim 9.

22. A water system containing the composition of claim 10.

23. A water system containing the composition of claim 11.

24. A water system containing the composition of claim 12.

25. An electrical insulation varnish containing the composition of claim 13.

26. An electrical insulation varnish containing the composition of claim 19.

27. A process for preparing a water soluble and/or dispersible composition characterized by the presence of an oil modified, imidized polyester, said process comprising:
(a) adding a polycarboxylic acid or an anhydride thereof to an oil modified imidized polyester, said polycarboxylic acid serving as a solutizer;
(b) adding a curing resin to the product of step (a); and
(c) adding a basic compound selected from the group consisting of ammonia and amines to the product of step (b) to form solubilizing salts thereof.

28. The process of claim 27 wherein said polycarboxylic and or anhydride serving as solutizer is selected from the group consisting of aliphatic, cycloaliphatic and aromatic di- and tri- carboxylic acids and the anhydrides thereof.

29. The process of claim 27 wherein said basic compound is a tertiary amine.

30. The process of claim 27 wherein said basic compound is volatilizable at about 100° C.

31. The process of claim 27 wherein said polycarboxylic acid or anhydride is trimellitic anhydride and said basic compound is dimethylethanolamine.

* * * * *